United States Patent [19]

Connolly

[11] Patent Number: 5,432,545
[45] Date of Patent: Jul. 11, 1995

[54] COLOR DETECTION AND SEPARATION METHOD

[76] Inventor: Joseph W. Connolly, University of Scranton, Dept of Physics/Electrical Engineering, Scranton, Pa. 18510-4642

[21] Appl. No.: 161,699

[22] Filed: Dec. 6, 1993

Related U.S. Application Data

[63] Continuation of Ser. No. 818,140, Jan. 8, 1992, abandoned.

[51] Int. Cl.⁶ ............................................. H04N 7/18
[52] U.S. Cl. ...................................... 348/91; 348/127; 348/130; 209/522; 209/580; 209/655; 209/939; 250/223 B; 250/226
[58] Field of Search .................. 358/93, 28, 80, 108, 358/518, 520, 522; 382/17, 18, 51; 209/522, 523, 580, 581, 939, 655; 250/223 R, 223 B, 226; 348/61, 86, 89, 91, 92, 93, 127, 129, 130, 649

[56] References Cited

U.S. PATENT DOCUMENTS

| | | | |
|---|---|---|---|
| 1,626,359 | 4/1927 | Rundell | 209/580 |
| 3,659,710 | 5/1972 | Tice | 209/522 |
| 4,408,224 | 10/1983 | Yoshida | 358/108 |
| 4,488,245 | 12/1984 | Dalke | 358/80 |
| 4,714,955 | 12/1987 | Nishimura et al. | |
| 4,718,089 | 1/1988 | Hayashi | 382/17 |
| 4,725,879 | 2/1988 | Eide | 382/17 |
| 4,772,945 | 9/1988 | Tagawa et al. | 358/108 |
| 4,805,016 | 2/1989 | Kato | 358/80 |
| 4,812,904 | 6/1989 | Maring et al. | |
| 4,907,075 | 3/1990 | Braudaway | 358/75 |
| 4,975,970 | 12/1990 | Zettel | 382/18 |
| 4,979,029 | 11/1990 | Lemelson | |
| 5,020,675 | 6/1991 | Cowlin | 209/939 |
| 5,150,307 | 9/1992 | McCourt | 209/580 |
| 5,182,776 | 1/1993 | Suzuki et al. | 358/108 |
| 5,206,918 | 4/1993 | Levene | 382/17 |

FOREIGN PATENT DOCUMENTS

| | | | |
|---|---|---|---|
| 63-66557 | 3/1988 | Japan | 382/18 |
| 2287892 | 11/1990 | Japan | 382/17 |

*Primary Examiner*—Howard W. Britton
*Assistant Examiner*—Bryan S. Tung
*Attorney, Agent, or Firm*—Larson and Taylor

[57] ABSTRACT

A method is provided for detecting the color of objects such as bottles to be recycled so as to enable the bottles to be separated by color. The method which is particularly concerned with determining the color of an object (bottle) with a label attached thereto, begins with the storing of a reference image. Next, a determination is made of whether a bottle is present or absent. If a bottle is present, the image of the bottle is then separated into an intensity image representation of the bottle image, a saturation image representation of the bottle image, and a hue image representation of the bottle image. Then, the reference image is subtracted from the intensity image so that a resultant image is produced with the background contribution removed. Next, a logical "AND" operation is performed on the resultant image and the hue image to create a further image which has no background components. A histogram is then performed on the further image to determine the hue with the maximum number of occurrences. Finally, the position of the color of the object in a three dimensional color subspace is determined by utilizing the hue with the maximum number of occurrences together with the saturation image and the intensity image.

14 Claims, 2 Drawing Sheets

COLOR DETECTION AND SEPARATION METHOD

This application is a continuation of application Ser. No. 07/818,140 filed Jan. 8, 1992 now abandoned.

FIELD OF THE INVENTION

This invention relates generally to color detection and more specifically, to a color detection method for plastic bottles which enables refined recycling of the bottle plastic.

BACKGROUND OF THE INVENTION

In a recycling center, plastic household bottles arrive in a wide variety of colors; an inspection of the shelves in a supermarket will provide a preview of what will be found in the recycling center. The bottles that arrive at the center are then shredded into tiny pieces (approximately 2 mm.×2 mm.) which have the labels still attached. Thus, after shredding, a single bottle will be divided into hundreds of pieces. While the color of each piece might be uniform, where the bottles are to be separated by color after shredding it is necessary to perform a color measurement of each of the individual pieces. Further, the small segments also will present material handling problems. Therefore, it is clearly desirable to detect the color of the plastic bottle before the bottle is shredded, so that the bottles may be sorted as to color before shredding. However, the use of an automated system to detect bottle color presents an obvious problem: a bottle made of a particular color plastic may have a label of a second color with lettering of a third color. In fact, the desire on the part of the manufacturer to catch the eye of the consumer usually results in there being many different colors on the label.

There are a number of different methods for detecting the color of an object and some of these methods are disclosed in the patents discussed below.

U.S. Pat. No. 4,488,245 (Dalke et al.) discloses a process for color detection wherein the recognition of color is based on the definition of a three-dimensional color subspace. The brightness and luminance of are used to determine a color value. This color value is then digitized. The digitized value is then compared to patterns which define the different color sub-spaces.

U.S. Pat. No. 4,714,955 (Nishimura et al.) discloses a color camera having several selective filters for passing specific wavelengths of light. The output of the filters are fed into an algorithm to determine the primary color, e.g. Red, Green, and Blue (RGB) components of the original object.

U.S. Pat. No. 4,718,089 (Hayashi et al.) discloses a video camera that views an object. The signal corresponding to the object is then processed so as to separate the luminance signal from the image signal. Two color signals are then compared to the signal to determine whether the luminance signal falls within an acceptable range. If the luminance signal is within the range, then there is a logical "0" generated, else a logical "1" is generated. The ability to determine the luminance is only one part in determining the "color" of an object and the presence of a label on the object would provide false luminance information.

U.S. Pat. No. 4,812,904 (Maring et al.) discloses an optical color analysis process which employs a camera which takes a picture of an object. This picture is then digitized. The digitized picture is then broken down into component RGB values and is compared with a reference signal to determine if they are statistically similar.

U.S. Pat. No. 4,907,075 (Braudaway) discloses a system comprising a video camera, a computer, and a display. The video camera takes a digitized picture of an object located below the camera. Then this digitized picture is divided into pixels. Each pixel is identified with a specific color and intensity. An overall color is generated by parsing each pixel and determining the centroid color, the color having the greatest number of pixels. This color is then used as the base color of the object. This method of determining color is inaccurate if the object is moving.

U.S. Pat. No. 4,979,029 (Lemelson) discloses a system that incorporates a video camera that is used to detect colors and/or shapes. The system then performs actions based on the detection of specific colors or shapes.

A major disadvantage of the methods and systems described above is that they are generally not suitable for use in determining the color of an object having a label of a different color attached thereto. Further, in some instances, the methods and systems are unable to detect the color of a moving object.

SUMMARY OF THE INVENTION

According to the invention, an automated color detection and separation method is provided which has the advantages of being able to identify the color of an object, to distinguish the color of the object from the color of a label attached thereto, and to greatly increase the processing speed for such objects (by about tenfold).

The method for determining the color of a moving object with a label attached thereto includes the following steps: first, an image of the object is formed; then the image is broken out into a plurality of pixels; next, the image is separated into color-defining parameter images, such as an intensity image, a saturation image and a hue image; and thereafter, one of the color-defining parameters is selected to determine the color having the maximum number of occurrences. The position of the color in a three-dimensional subspace is then determined by using the parameter having the maximum number of occurrences together with the other two color-determining parameters.

Additional steps are advantageously added to reduce the noise associated with the image of the object.

Other features and advantages of the invention will be set forth in, or apparent from, the following detailed description of the preferred embodiment of the invention.

DESCRIPTION OF THE PREFERRED EMBODIMENTS

Figure 1:
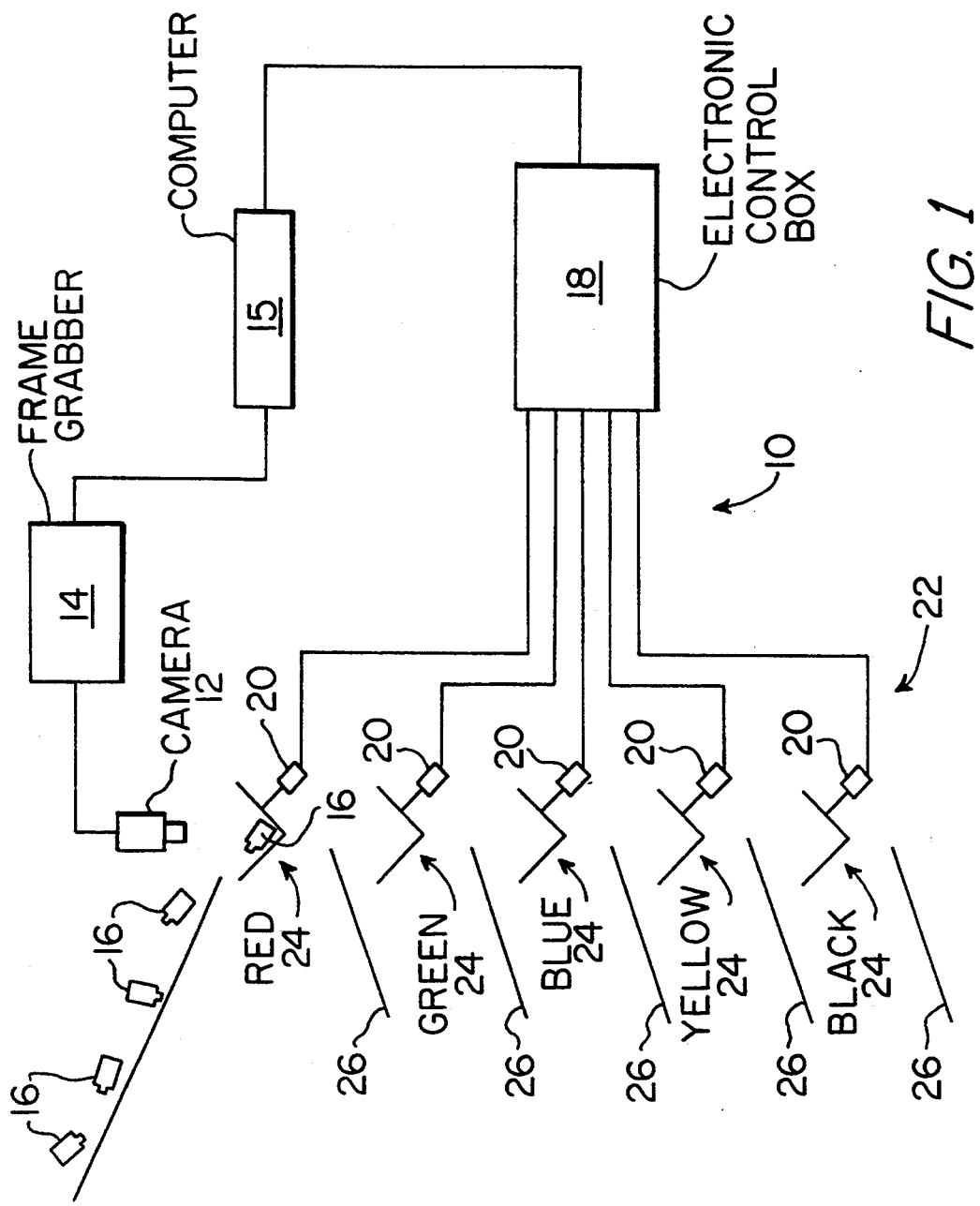
FIG. 1 is a block diagram of a color detection and separation system constructed in accordance with a preferred embodiment of the invention.

Referring to FIG. 1, a color detection and separation system, generally denoted 10, is illustrated which includes a charge coupled device (CCD) red-green-blue (RGB) color video camera 12 the output signal from which is fed into a microcomputer controlled "frame grabber" 14 for image capture. The frame grabber 14 may be in integral part of either the camera 12 or a computer 15, or unit 14 may be a separate device as illustrated. An electronic picture is taken by the frame grabber 14 and that the electronic picture is broken into pixels (picture elements, i.e., tiny rectangular areas) by the computer 15 or the frame grabber 14. In a preferred embodiment, the horizontal resolution is 512 pixels and the vertical resolution is 512 pixels. Since the camera 12 and the frame grabber 14 are three channel devices, each channel provides a separate image for the three primary colors: red, green and blue. From these three primaries all other colors can be calculated in accordance with standard color theory. For instance, the frame grabber 14 may capture images in HSI (Hue-Saturation-Intensity) color space. The HSI color space uses the hue or predominant color (e.g., distinguishes red vs. green vs. blue vs. etc.), the saturation level (e.g., distinguishes red vs. pink) and the intensity or equivalent grey level (e.g., distinguishes dark red vs. bright red) to categorize the color of an object. As with the RGB space, all colors may be determined from just the three HSI coordinates. Thus, the image provided of a plastic bottle consists of up to three-quarters of a million pixels (3 channels×512 horizontal×512 vertical). The frame grabber 14 uses eight bits per channel. Therefore, in theory, up to sixteen million (256×256×256) colors may be determined. However, system noise, primarily in the camera 12, results in only the upper four bits being reliable. This reduces the number of detectable colors to about four thousand (16×16×16). This restriction is not serious in the separation of colored plastic bottles. Such bottles are indicated at 16 in FIG. 1. The information from frame grabber 14 is sent to a computer 15 which will determine the presence and color of a bottle 16.

One consideration in the design of the color detection and separation system 10 is that the system should be mechanically simple. The objective is to maximize reliability and eliminate the need for a skilled operator. Therefore, moving parts and unnecessary electronics are kept to a minimum. The present invention is preferably designed to have the camera 12 "staring" at a blank background. A continuous series of pictures are taken and compared with a reference background that has been stored in computer 15. By continuously comparing the newly acquired image with the reference image, it is possible to determine when a bottle 16 has arrived in the field of view of camera 12 without the use of mechanical switches or photocells. Once it has been determined that a bottle 16 is present, a fraction of a second is allowed to let the bottle come to rest and the color analysis takes place and is described in greater detail below.

After the color parameters have been determined by computer 15, a signal is sent to an electronic circuit box 18 from computer 15. This circuit box 18 is simply provided to permit the low voltage, low current computer signal to control a plurality of heavy duty industrial relays 20 capable of switching 30 amp circuits. The relays 20 operate the pneumatic controls of a mechanical separation system, generally denoted 22.

The mechanical separation system 22 has trap doors 24 which are actuated by relays 20. The trap doors 24 deliver a bottle 16 to a conveyer 26 or any other delivery system known in the art. The conveyers 26 deliver the bottle to a storage bin (not shown). In this fashion, a recycler may shred all the bottles 16 in a particular storage bin and be assured that the bottles 16 are of a particular color group.

Figure 2:
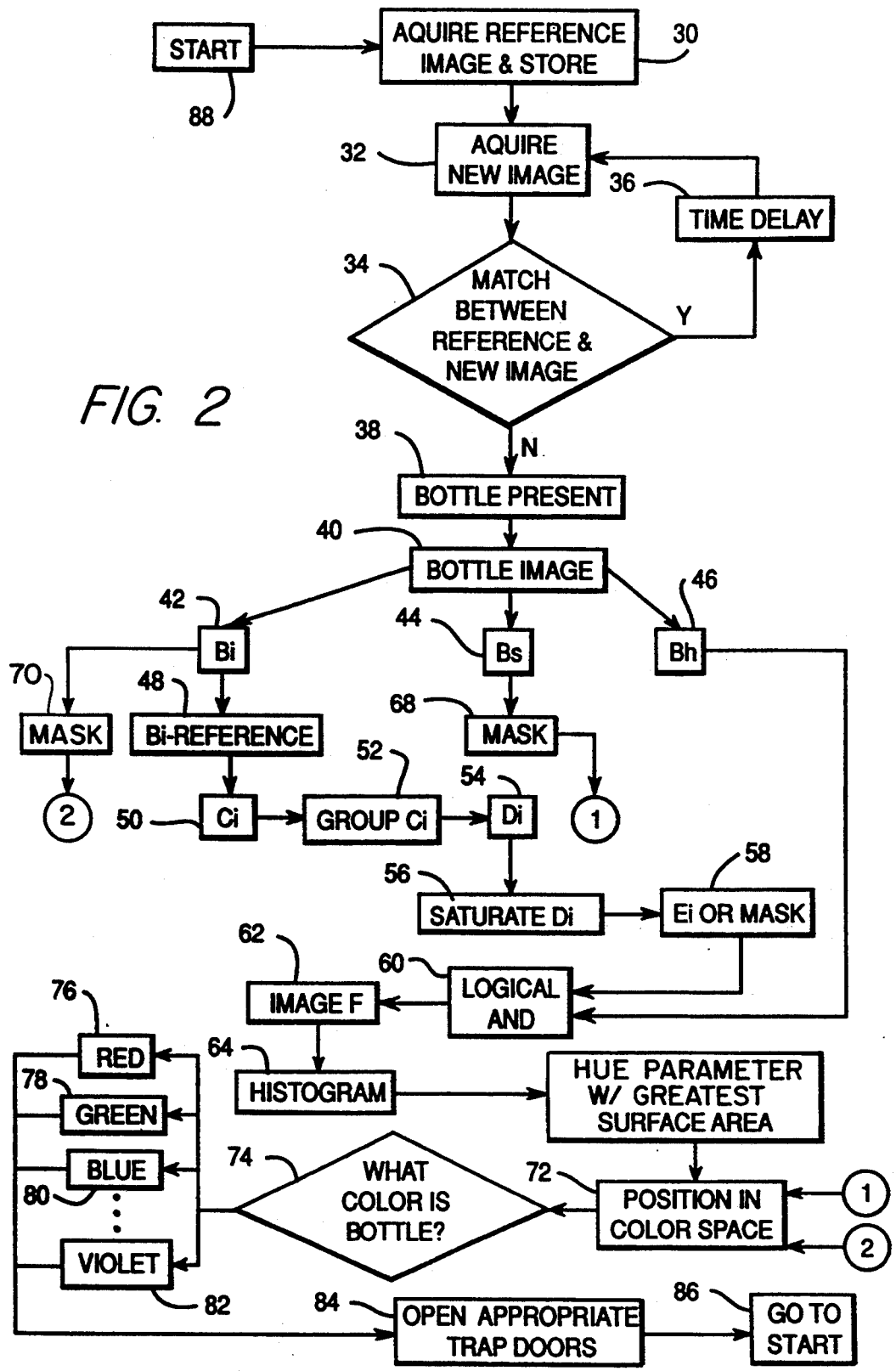
FIG. 2 is a logical flowchart of the color detection and separation system of FIG. 1.

FIG. 2 is a logical flow chart of the method involved in the color detection and separation of plastic bottles. At the beginning of the operation, an image is captured of a dark reference background (image A) as is illustrated by block 30. This image is processed by frame grabber 14 and stored in computer 15. The bottles are then allowed to approach the target area, one at a time. As a bottle reaches the end of the top conveyor belt, the bottle then falls into the field of view camera 12. Within a period of a fraction of a second, a series of new pictures or images are taken as illustrated by block 32. A continuously running subtraction process will detect the presence or absence of a bottle 16. These pictures or images are compared with the reference image by subtraction on a pixel by pixel basis of the intensity channel as is illustrated in decision diamond 34. As long as the images match, an outcome represented by a logical "Y", another new image is taken at a predetermined interval indicated by time delay block 36. The presence of a logical "Y" indicates that a bottle is not present. If the images do not match, a situation represented by the logical "N" branch, there is a bottle 16 present as illustrated by block 38. Since the bottles are of varying size and shape, it is necessary to eliminate the effect of the background using a series of mathematical operations described below.

Because the bottle may still have been moving when the first picture is taken, another picture of the bottle is taken after a short time interval approximately 0.25 seconds in an exemplary embodiment. This bottle image is represented by block 40. The frame grabber 14 provides information on three channels: intensity (image Bi), saturation (image Bs) and hue (image Bh) and are represented by blocks 42, 44, and 46, respectively. Subtraction of the reference image from the intensity image Bi is performed and a resultant new image produced, referred to as image Ci, as is represented by blocks 48 and 50. This subtraction has the effect of eliminating any background contribution to the color detection process.

Because image Ci does not contain the true intensity value, it cannot be used directly. Image Ci is also very noisy. The effect of noise is reduced by grouping the values of image Ci. More specifically, rather than using values which range over 256 values, the values are grouped into 16 categories. For example, all values that range from 0 to 15 are grouped into value 0, all values from 16 to 31 are grouped into value 16, etc. The number of groups is arbitrary and can be easily changed.

After the image has been grouped, the resultant image is called image Di and the grouping step and the resultant thereof are represented by blocks 52 and 54. Image Di still contains false intensity values. Pixel positions that are at the same row and column in the reference image and the bottle image Bi will have a value of 0 if they represent the background region. The pixel values in the bottle region of the image will be greater than 0. Image Di is saturated by multiplying each pixel by 255 and this step is represented by block 56. If a pixel in image Di has a value of 0, the pixel will still be 0 after multiplication. If the pixel in image Di has a value other than 0, the pixel will be saturated and have a value of 255. The saturated image, denoted Ei, therefore consists of pixels with values either 255 (where the bottle is present) or 0 (background). Image Ei is called a "mask."

A logical "AND" operation is performed between image Ei, the mask, and image Bh, the hue channel of the image, and this is illustrated by block 60. The logical "AND" between 0 and any number will give 0, and the logical "AND" between 255 and any number will give that number. Since the resultant image F, indicated by block 62, is equal to image Bh "AND" image E, the image F is of the bottle with no contribution from the background. Unfortunately, the bottle label and the lettering thereon are still present.

A histogram is now performed on the quarter million pixels in image F as is represented by block 64. From this histogram the hue with the highest number of pixels is obtained as is represented by block 66. The result is the color with the greatest surface area. Experience has shown that the color with the greatest surface area is the color of the plastic material rather than the label. The predominant hue value is represented as a number between 0 and 255. In order to fully determine the position of the color in color space, it is necessary to determine the other two coordinates: saturation and intensity. Through a series of logical steps, the images Bs and Bh are used to create other masks. This is indicated schematically by masks 68 and 70 which used to determine the most frequently occurring saturation and intensity of those pixels with the predominant hue value.

The bottle's predominant hue, saturation, and intensity are next used to compute a position in color space, as is indicated by block 72. This position in color space is compared to the colors of the separation groups (the desired colors of the recycled material). A determination is then made as to which of the separation groups is nearest to the color of the bottle, as is represented by decision diamond 74 and boxes 76, 78, 80, and 82. By writing the proper digital code to the parallel board of the microcomputer, signals are sent to the electronic control box 18 and the appropriate trap doors are opened, as indicated by block 84. For example, if a given bottle is to be separated with the "reds," only the first trap door 24 is opened whereas if the bottle is to go with the "greens," both the first and second trap doors 24 are opened. Once the bottle drops to the appropriate level, the bottle slides along a chute 26 or another material handling system as described above. This process is repeated until the system 10 is turned off, as is illustrated by boxes 86 and 88.

Although the present invention has been described relative to specific exemplary embodiments thereof, it will be understood by those skilled in the art that variations and modifications can be effected in these exemplary embodiments without departing from the scope and spirit of the invention. One such variation is the selection of either the intensity or saturation as the primary mask described above. Another variation would be to use alternative color spaces to HSI or RGB.

What is claimed is:

1. A method for determining the color of an object with a label attached thereto so that the object may be sorted by color, the method comprising the steps of:
   forming an image of the object;
   digitizing the image into a plurality of pixels separated into pixel images of three color-defining parameters;
   using a selected one of the color-defining parameter pixel images to generate a primary mask;
   performing an AND operation with the primary mask and one of the other color-defining parameter pixel images as inputs so as to generate a further pixel image having the background of the object eliminated therefrom;
   using a histogram of said further pixel image to determine the color-defining parameter of one of the said other color-defining parameter pixel image having the greatest number of occurrences in the pixels of the further pixel image; and
   using the color-defining parameter so determined to determine the color of the greatest surface area of the object.

2. A method as claimed in claim 1 wherein said three color-defining parameters are hue, saturation and intensity.

3. A method as claimed in claim 2 wherein the histogram is used to determine the most frequently occurring pixels in the hue image and the hue of the object is determined to be that of the most frequently occurring hue pixels.

4. A method as claimed in claim 1, further comprising using the color-defining parameter determined using the histogram together with corresponding predominant values of the other two color-defining parameters and thereafter determining the color of the object from the three color-defining parameters determined from the previous steps.

5. A method as claimed in claim 1, further comprising using the color-defining parameter determined using the histogram together with corresponding predominant values of the other two color-defining parameters to compute a resultant position in color space.

6. A method as claimed in claim 5 further comprising comparing the resultant position in color space to colors of a plurality of separation groups, determining the separation group which is closest in color to the color of the object, and separating the object into that separation group.

7. A method as claimed in claim 5 wherein said color-defining parameters are hue, saturation and intensity.

8. A method as claimed in claim 7 wherein the histogram is used to determine the most frequently occurring pixels in the hue image and the hue of the object is determined to be that of the most frequently occurring hue pixels.

9. A method as claimed in claim 7 wherein said channels of color-defining parameters are hue, saturation and intensity channels.

10. A method for determining the color of an object with a label attached thereto so that the object may be sorted by color, the method comprising the steps of:
    forming an image of the object;
    digitizing the image into a plurality of pixels separated into pixel images of three color-defining parameters;
    using a selected one of said color-defining parameter pixel images to generate a primary mask;
    performing an AND operation with the primary mask and one of the other color-defining parameter pixel images as inputs so as to generate a further pixel image;
    using a histogram of said further pixel image to determine the parameter of one of said other color-defining parameter pixel image having the greatest number of occurrences in the pixels of the further pixel image;
    using the parameter so determined, together with the remaining two color-defining parameter images, to determine the parameters of each of said remaining two color-defining parameter pixel images having the greatest number of occurrences in the pixels; and determining the color of the object using the three parameters determined by the previous steps.

11. A method as claimed in claim 10 further comprising comparing the color of the object with the colors of a plurality of separation groups and sorting the object into one of the groups based on the comparison.

12. A method as claimed in claim 11 wherein the histogram is used to determine the most frequently occurring pixels in the hue channel and the hue of the object is determined to be that of the most frequently occurring hue pixels.

13. A method for determining the colors of objects so as to permit the objects to be sorted by color, said method comprising:

storing an image of a background viewed by an electronic camera in the absence of an object in the field of view of the camera;

determining the presence or absence of an object in the field of view of the camera based on a comparison of the image presently being produced by the camera with the stored background image;

when an object is determined to be present, using the camera to view the entire object and to produce a corresponding image of the object;

digitizing the image of the object produced by the camera into three separate channels of color defining parameters;

eliminating the effect of the contribution of the background to the image being produced by the camera when an object is determined to be present to thereby produce a primary mask;

performing an AND operation with the primary mask and the image of each of the three channels to thereby produce a further image;

using a histogram to detect the most frequently occurring pixel values in one of the channels of the further image and using this determination to define the predominant color defining parameter of that channel;

determining the predominant color defining parameters of the other two channels; and determining the color of the object based on the predominant color-defining parameters of the three channels.

14. A method as claimed in claim 13 further comprising comparing the color of the greatest surface area of the object with the colors of a plurality of separation groups and sorting the object into one of the groups based on the comparison.

* * * * *